(12) United States Patent
Shimazaki et al.

(10) Patent No.: US 9,829,050 B2
(45) Date of Patent: Nov. 28, 2017

(54) ROTARY-MEMBER LUBRICATING STRUCTURE

(71) Applicant: HONDA MOTOR CO., LTD., Tokyo (JP)

(72) Inventors: Itsuki Shimazaki, Wako (JP); Yuuichi Hidaka, Wako (JP); Yoshiaki Syutou, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 343 days.

(21) Appl. No.: 14/737,491

(22) Filed: Jun. 12, 2015

(65) Prior Publication Data
US 2015/0362024 A1 Dec. 17, 2015

(30) Foreign Application Priority Data
Jun. 13, 2014 (JP) ................................ 2014-122098

(51) Int. Cl.
| | |
|---|---|
| *F16H 57/04* | (2010.01) |
| *F16D 13/74* | (2006.01) |
| *F16H 57/027* | (2012.01) |
| *F16H 57/02* | (2012.01) |

(52) U.S. Cl.
CPC ........... *F16D 13/74* (2013.01); *F16H 57/027* (2013.01); *F16H 57/0409* (2013.01); *F16H 57/0423* (2013.01); *F16H 57/0473* (2013.01); *F16D 2300/0214* (2013.01); *F16D 2300/26* (2013.01); *F16H 57/0424* (2013.01); *F16H 2057/02043* (2013.01); *Y10T 74/2186* (2015.01)

(58) Field of Classification Search
None
See application file for complete search history.

(56) References Cited

FOREIGN PATENT DOCUMENTS

JP  2005-308044  11/2005

*Primary Examiner* — Robert A Siconolfi
*Assistant Examiner* — Ryan Dodd
(74) *Attorney, Agent, or Firm* — Mori & Ward, LLP

(57) ABSTRACT

A rotary-member lubricating structure includes a housing, a baffle portion, a support portion, and a bolt. The baffle portion has a shape conforming to a shape of a rotary member included in a speed-changing mechanism and covers the rotary member to collect or discharge scattered lubricating oil. The baffle portion includes a first partial baffle portion provided on a first side of the rotary member and a second partial baffle portion provided on a second side of the rotary member. The first partial baffle portion has a protrusion protruding radially outward from an outer circumference of the baffle portion and a fastening hole provided in the protrusion and extending through the first partial baffle portion in an axial direction of the rotary member. The second partial baffle portion has a filling portion to fill a recess in the first partial baffle portion provided due to the protrusion.

10 Claims, 12 Drawing Sheets

ROTARY-MEMBER LUBRICATING STRUCTURE

CROSS-REFERENCE TO RELATED APPLICATIONS

The present application claims priority under 35 U.S.C. §119 to Japanese Patent Application No. 2014-122098, filed Jun. 13, 2014, entitled "Rotary-member lubricating structure." The contents of this application are incorporated herein by reference in their entirety.

BACKGROUND

1. Field

The present application relates to a rotary-member lubricating structure.

2. Description of the Related Art

Conventionally, a rotary-member lubricating structure, such as a clutch apparatus provided with a baffle plate that serves as a baffle portion for collecting scattered lubricating oil, is known (see, for example, Japanese Unexamined Patent Application Publication No. 2005-308044). This baffle plate is disposed such that it covers an input shaft and an output shaft from below. In Japanese Unexamined Patent Application Publication No. 2005-308044, lubricating oil scattered in a housing is guided to the position of an oil reservoir by the baffle plate, and the mixing resistance of a final gear is reduced.

SUMMARY

According to one aspect of the present invention, a rotary-member lubricating structure includes a housing, a baffle portion, a support portion, and a plurality of bolts. The housing accommodates a speed-changing mechanism including a rotary member and accommodates lubricating oil for lubricating the speed-changing mechanism. The housing includes a first partial housing provided on one side and a second partial housing provided on the other side. The baffle portion is formed in a shape conforming to the shape of the rotary member included in the speed-changing mechanism and covers the rotary member to collect or discharge scattered lubricating oil. The baffle portion includes a first partial baffle portion provided on one side of the rotary member and a second partial baffle portion provided on the other side of the rotary member. The support portion is disposed between the first partial housing and the rotary member in the axial direction and supports the rotary member so as to be relatively rotatable. The plurality of bolts are disposed on the outer side of the rotary member in the circumferential direction and are used to fix the support portion and the first partial baffle portion to the first partial housing. The first partial baffle portion has protrusions protruding radially outward from the outer circumference of the baffle portion and has fastening holes provided in the protrusions and extending through the first partial baffle portion in the axial direction, into which fastening holes the plurality of bolts are screwed. The first and second partial housings are joined together by a plurality of fixing members disposed on the radially outer side of the first and second partial baffle portions. The second partial baffle portion has filling portions that fill the recesses in the first partial baffle portion formed due to the provision of the protrusions.

According to another aspect of the present invention, a rotary-member lubricating structure includes a housing, a baffle portion, a support portion and a bolt. The housing accommodates a speed-changing mechanism including a rotary member and accommodates lubricating oil for lubricating the speed-changing mechanism. The housing includes a first partial housing provided on a first side of the rotary member and a second partial housing provided on a second side of the rotary member opposite to the first side. The baffle portion has a shape conforming to a shape of the rotary member included in the speed-changing mechanism and covers the rotary member to collect or discharge scattered lubricating oil. The baffle portion includes a first partial baffle portion provided on the first side of the rotary member and a second partial baffle portion provided on the second side of the rotary member. The first partial baffle portion has a protrusion protruding radially outward from an outer circumference of the baffle portion and a fastening hole provided in the protrusion and extending through the first partial baffle portion in an axial direction of the rotary member. The second partial baffle portion has a filling portion to fill a recess in the first partial baffle portion provided due to the protrusion. The first and second partial housings are joined together with a fixing member disposed on a radially outer side of the baffle portion. The support portion is disposed between the first partial housing and the rotary member in the axial direction to support the rotary member so as to rotate with respect to the support portion. The bolt is disposed on an outer side of the rotary member in a circumferential direction of the rotary member to fix the support portion and the first partial baffle portion to the first partial housing and screwed into the fastening hole of the first partial baffle portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
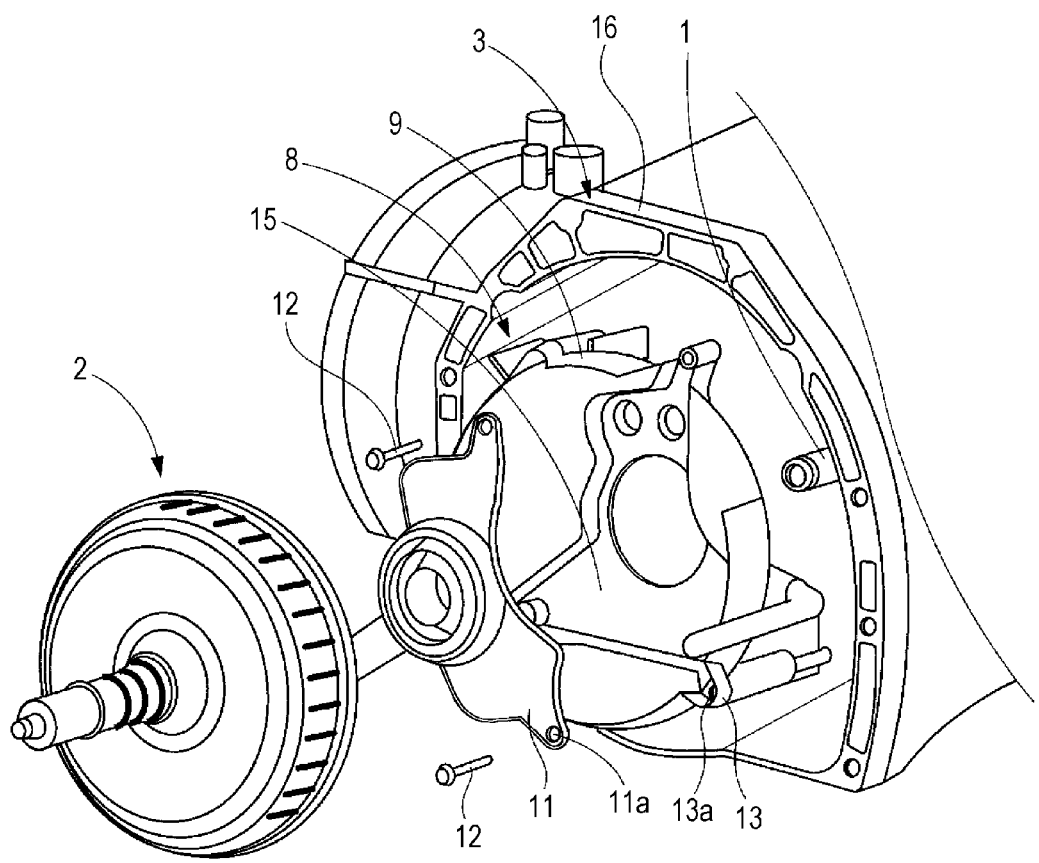
FIG. 1 is a perspective view of a power transmission apparatus to which a rotary-member lubricating structure according to an embodiment of the present application is applied.

The embodiments will now be described with reference to the accompanying drawings, wherein like reference numerals designate corresponding or identical elements throughout the various drawings.

An embodiment of a power transmission apparatus to which a rotary-member lubricating structure according to the present application is applied will be described below. The power transmission apparatus according to this embodiment includes, as shown in FIG. 1, a speed-changing mechanism 1, a friction clutch 2, and a housing 3 that accommodates the speed-changing mechanism 1 and the friction clutch 2.

Figure 2:
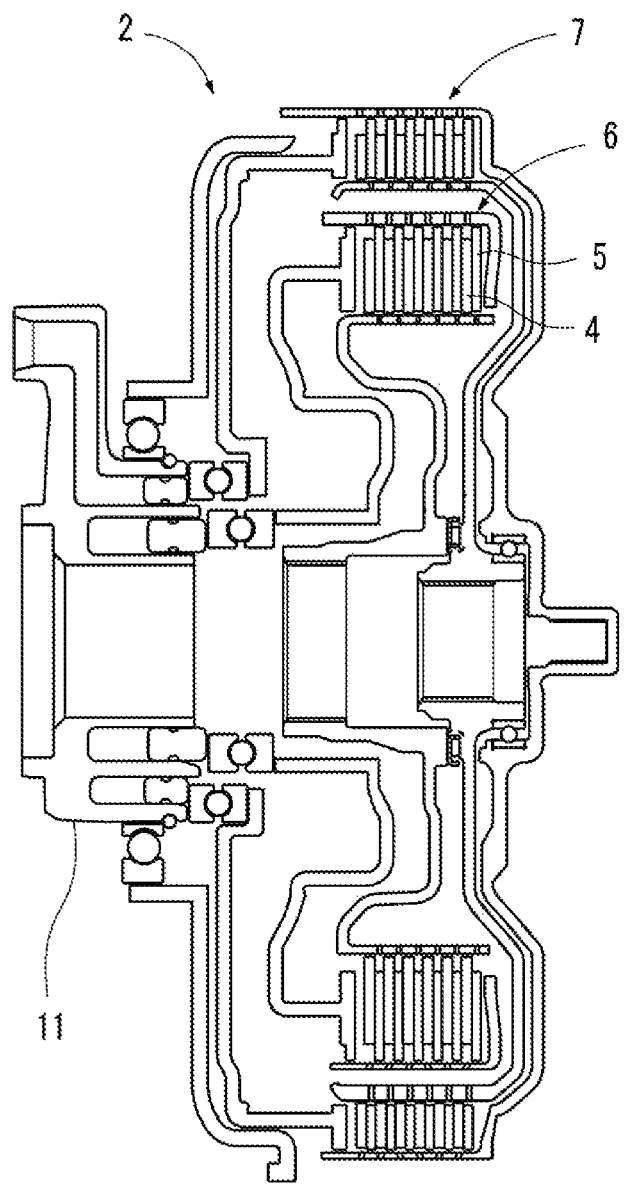
FIG. 2 is a sectional view of the power transmission apparatus according to this embodiment.

As shown in FIG. 2, the friction clutch 2 is formed of two clutches 6 and 7 that are arranged next to each other in the radial direction, the clutches 6 and 7 each including a plurality of disks 4 and ring-shaped plates 5 that are alternately stacked.

If the friction clutch 2 is disposed in the housing 3 in a bare state, the lubricating oil scattered by the rotation of the friction clutch 2 is deposited on the inner surface of the housing 3. The inner surface of the housing 3 has many projections and recesses due to the presence of bolt holes, etc. Hence, there are problems in that the lubricating oil deposited on the irregular inner circumferential surface of the housing does not smoothly flow down and in that the mixing resistance of the friction clutch 2 increases due to the influence of the turbulent flow of the lubricating oil caused by the irregularities.

Figure 3:
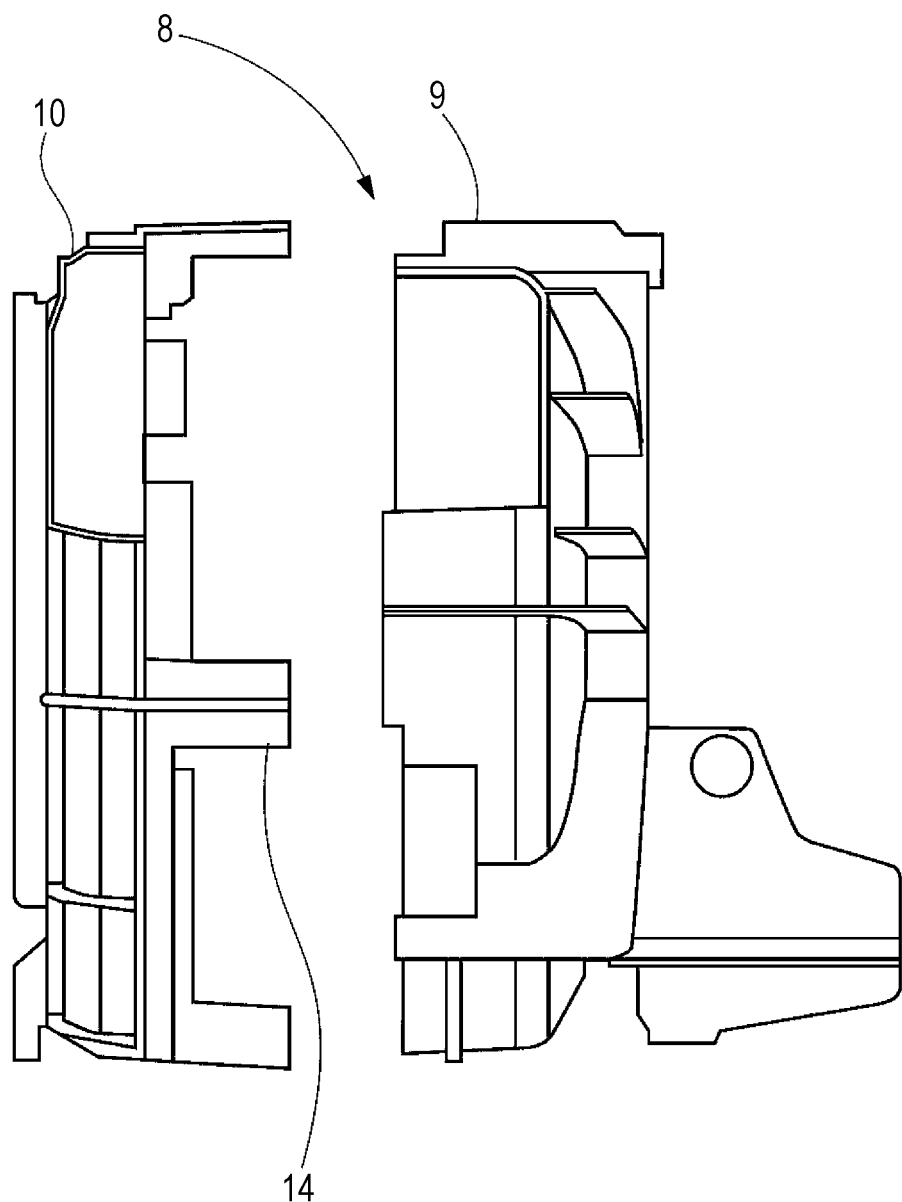
FIG. 3 is an exploded view of a baffle portion according to this embodiment.

To overcome these problems, the friction clutch 2 according to this embodiment is covered with a baffle portion 8 that is made of synthetic resin, as shown in FIG. 3. The baffle portion 8 is formed by fitting together a first partial baffle portion 9 provided on one side of the friction clutch 2 in the direction along the rotation shaft and a second partial baffle portion 10 provided on the other side so as to sandwich the friction clutch 2 in the direction along the rotation shaft. This configuration prevents the lubricating oil from flowing into the housing from a fitting portion where the first partial baffle portion 9 and the second partial baffle portion 10 are fitted together.

Figure 4:
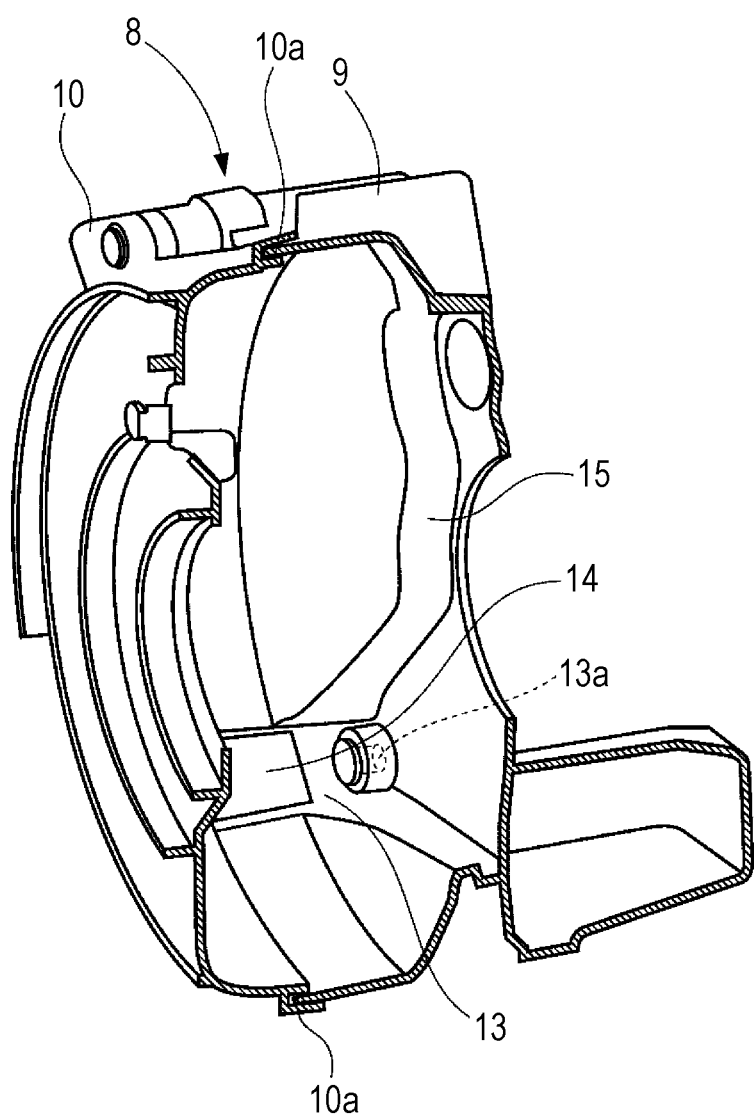
FIG. 4 is a sectional perspective view of the baffle portion according to this embodiment.

As shown in the sectional view in FIG. 4, the second partial baffle portion 10 is provided with a receiving groove 10a in the open end (the end close to the first partial baffle portion 9) thereof, into which the open end of the first partial baffle portion 9 (the end close to the second partial baffle portion 10) is inserted. By inserting the open end of the first partial baffle portion 9 into the receiving groove 10a, the open end of the first partial baffle portion 9 is pressed from both radially inside and outside by the receiving groove 10a. Thus, it is possible to prevent the lubricating oil from flowing into the housing from the fitting portion where the partial baffle portions 9 and 10 are fitted together.

Figure 12:
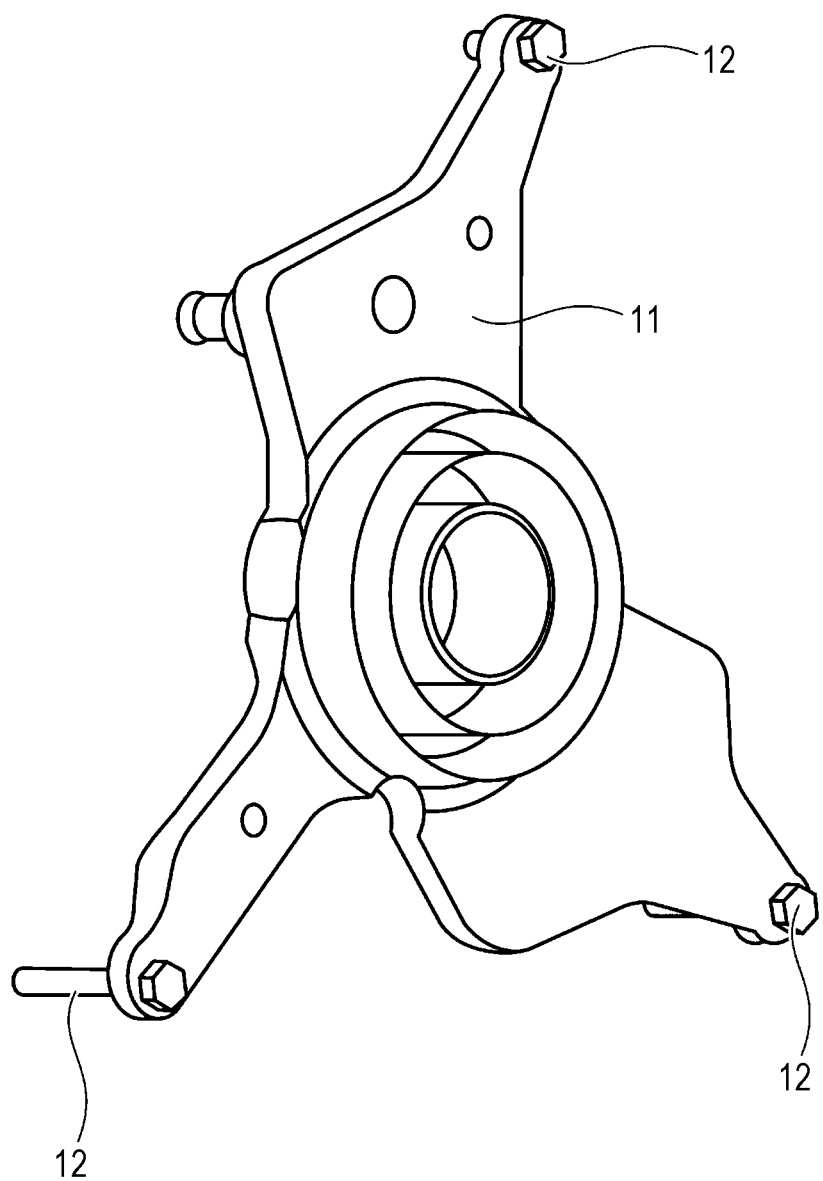
FIG. 12 is a perspective view of the support portion, with which the friction clutch according to this embodiment is fixed to the housing.

The friction clutch 2 is attached to the housing 3 with bolts 12, with a substantially triangular metal support portion 11 (see FIG. 12) therebetween. The friction clutch 2 is attached to the support portion 11 in a rotatable manner.

Insertion holes 11a provided in the support portion 11, through which the bolts 12 pass, are located on the radially outer side of the outer circumference of the friction clutch 2. With this configuration, the bolts 12 extending through the insertion holes 11a can be screwed to the housing 3, without interfering with the friction clutch 2.

Figure 5:
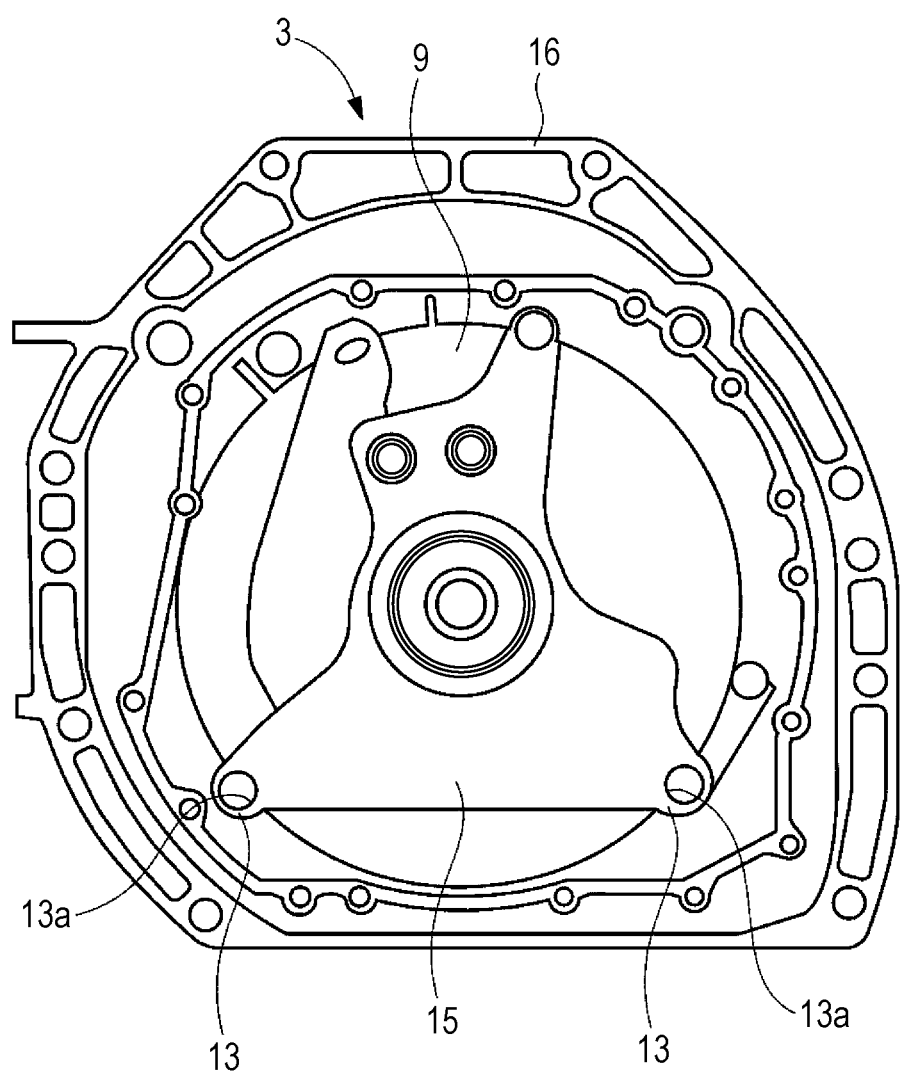
FIG. 5 shows a state in which a first partial baffle portion and a support portion according to this embodiment are attached to a housing.

Furthermore, the first partial baffle portion 9 is provided with protrusions 13 that protrude radially outward so as to correspond to the insertion holes 11a in the support portion 11. The protrusions 13 are provided with through-holes 13a (fastening holes) through which the bolts 12 extending through the insertion holes 11a in the support portion 11 can pass. With this configuration, as shown in FIG. 5, the first partial baffle portion 9 can be fixed to the housing 3 with the bolts 12 for fixing the friction clutch 2 to the housing 3, without needing dedicated bolts for the first partial baffle portion 9. Hence, the number of bolts can be reduced and the assembly process of the power transmission apparatus can be simplified.

If the first partial baffle portion 9 is provided with the protrusions 13, the inner circumferential surface of the baffle portion 8 that covers the entire circumference (including substantially the entire circumference) of the friction clutch 2 is not smooth in the circumferential direction and has recesses that are recessed radially outward at the protrusions 13. Hence, in such a structure, the lubricating oil deposited on the inner circumferential surface of the baffle portion 8 does not smoothly flow down, or the mixing resistance of the lubricating oil increases due to turbulent flow of the stirred lubricating oil occurring in the protrusions 13.

To counter these problems, the second partial baffle portion 10 according to this embodiment is provided with projecting portions 14 (filling portions) that fill the recesses due to the protrusions 13, so as to correspond to the two protrusions 13 located on the lower side among the three protrusions 13 in the first partial baffle portion 9.

Figure 6:
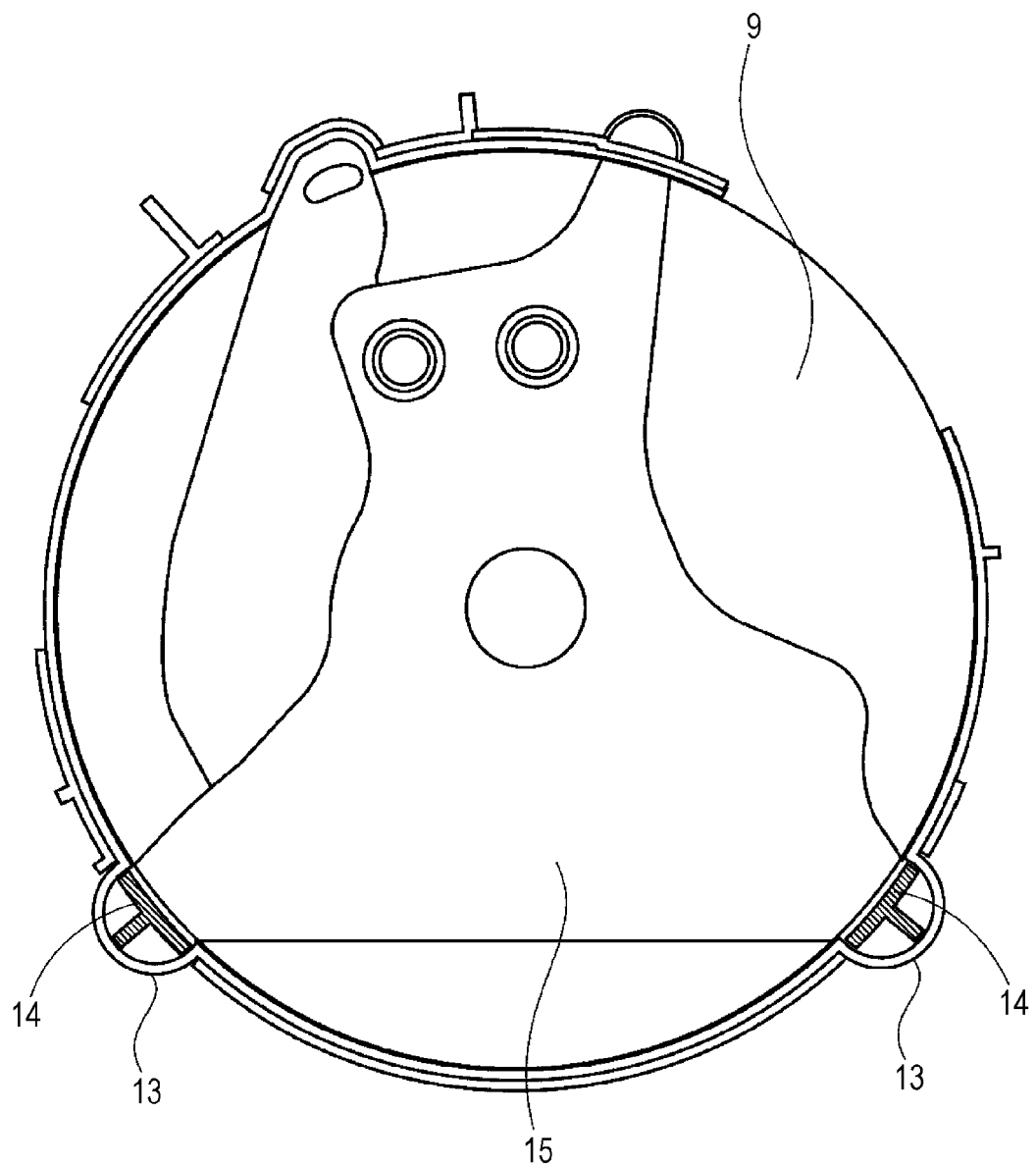
FIG. 6 is a sectional view of the baffle portion according to this embodiment, as viewed in the axial direction.

As shown in FIG. 6, these projecting portions 14 (filling portions) make the lower part of the inner circumferential surface of the baffle portion 8 a relatively smooth surface in the circumferential direction and prevent or suppress turbulent flow of the lubricating oil caused by the protrusions 13, reducing the mixing resistance of the lubricating oil, compared with a case where the projecting portions 14 are not provided.

If the substantially triangular support portion 11 for fixing the friction clutch 2 to the housing 3 is simply disposed in the baffle portion 8, the lubricating oil that is likely to rotate with the friction clutch 2, serving as the rotary member, at the side of the support portion 11 is blocked, which may increase the mixing resistance.

Hence, in the power transmission apparatus according to this embodiment, the first partial baffle portion 9 is provided with a receiving portion 15 that is recessed in the same shape as the support portion 11 so as to receive the support portion 11. With this configuration, the side edge of the support portion 11 is contained in the receiving portion 15, and the first partial baffle portion 9 and the support portion 11 form a substantially flat inner circumferential surface. Hence, the side edge of the support portion 11 does not block the lubricating oil, further reducing the mixing resistance.

The housing 3 is formed of a first partial housing 16 to which the first partial baffle portion 9 is attached, and a second partial housing 17 that covers the friction clutch 2 so as to sandwich the friction clutch 2 between the first partial housing 16 and the second partial housing 17. The first partial housing 16 and the second partial housing 17 are joined together with fastening members, such as bolts.

Figure 8:
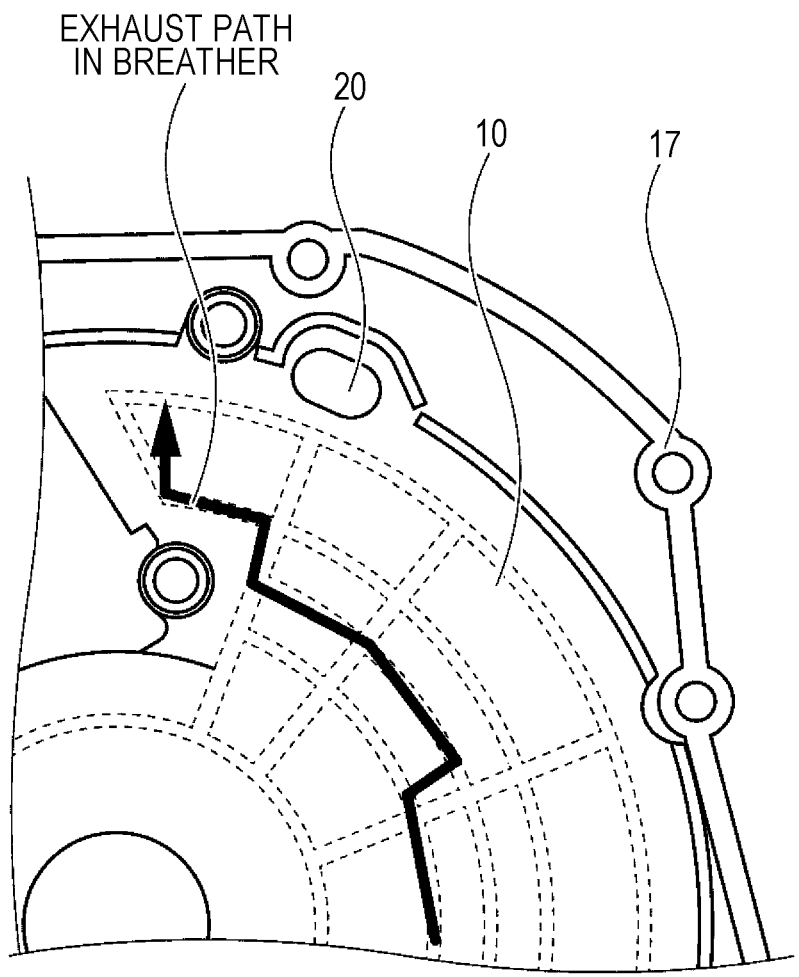
FIG. 8 shows a second partial baffle portion and the housing according to this embodiment.
Figure 9:
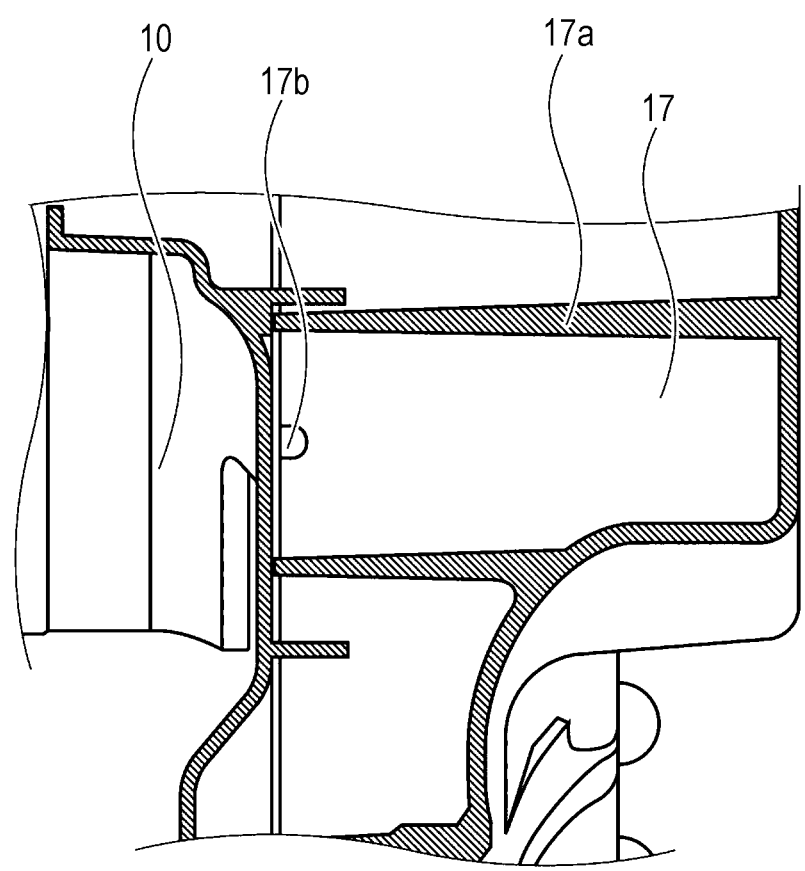
FIG. 9 is a sectional view of the second partial baffle portion and the housing according to this embodiment.
Figure 11:
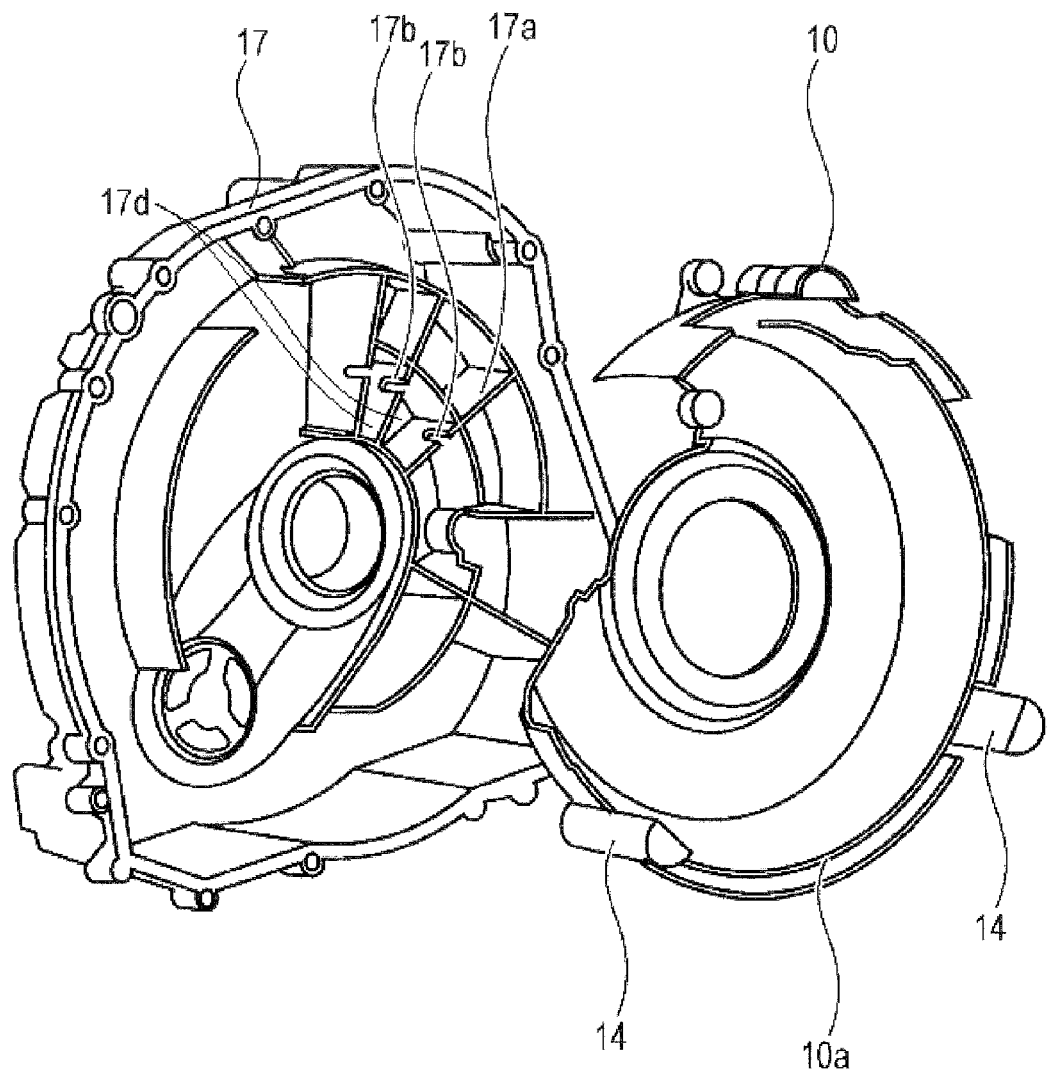
FIG. 11 is an exploded perspective view of the second partial baffle portion and the housing according to this embodiment.

Furthermore, as shown in the exploded view in FIG. 11, the second partial baffle portion 10 is fixed to the second partial housing 17 with bolts. The second partial housing 17 is provided with a grid-shaped rib 17a on the inner wall. As shown in FIG. 9, cutaway portions (grooves) 17b, which are formed by partially cutting away the rib 17a, are provided in the edges of the rib 17a. With this configuration, the second partial housing 17 and the second partial baffle portion 10 form a labyrinth structure for breathing therebetween. The arrow in FIG. 8 shows a path along which the exhaust passes through the labyrinth structure for breathing. Note that, by providing recesses in the second partial baffle portion 10, instead of the cutaway portions 17b, ventilation by the breather can be performed.

Figure 10:
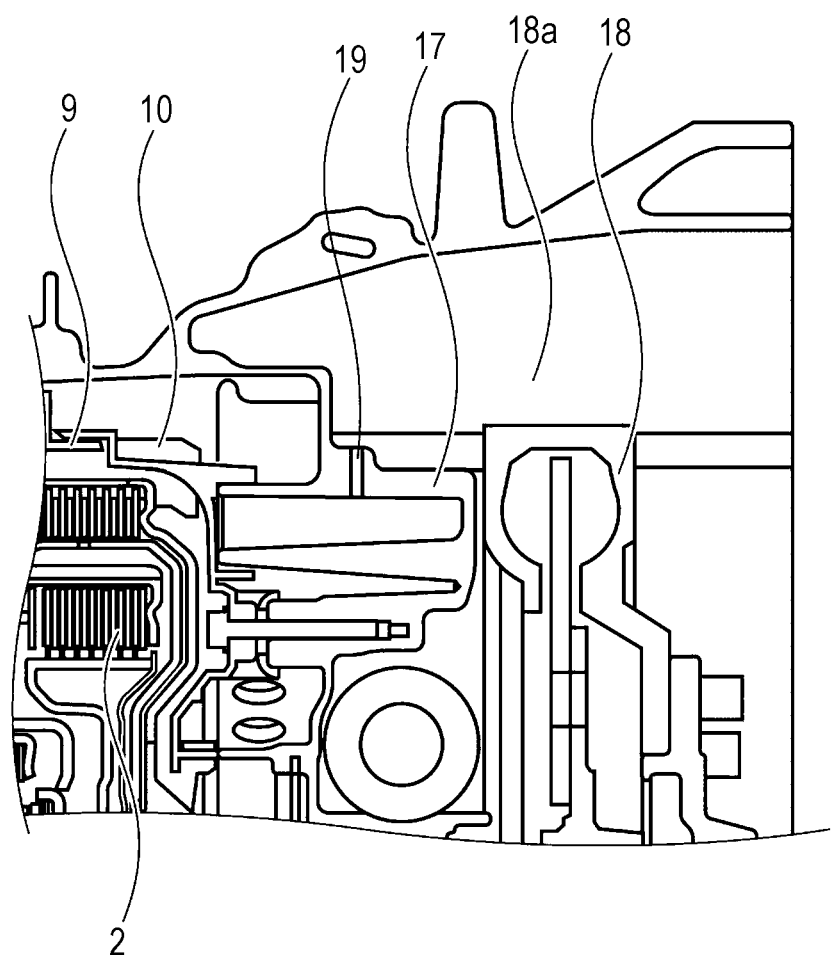
FIG. 10 is a sectional view of the breather and a damper mechanism of the power transmission apparatus according to this embodiment.

As shown in FIG. 10, the second partial housing 17 has, in the upper part thereof, a breather hole (communicating hole) 19 communicating with a damper chamber 18a that accommodates a damper mechanism 18. The damper chamber 18a communicates with the outside air. By making the breather hole 19 communicate with the damper chamber 18a, entrance of water and dust can be prevented without providing an additional cap for the breather hole 19.

Figure 7:
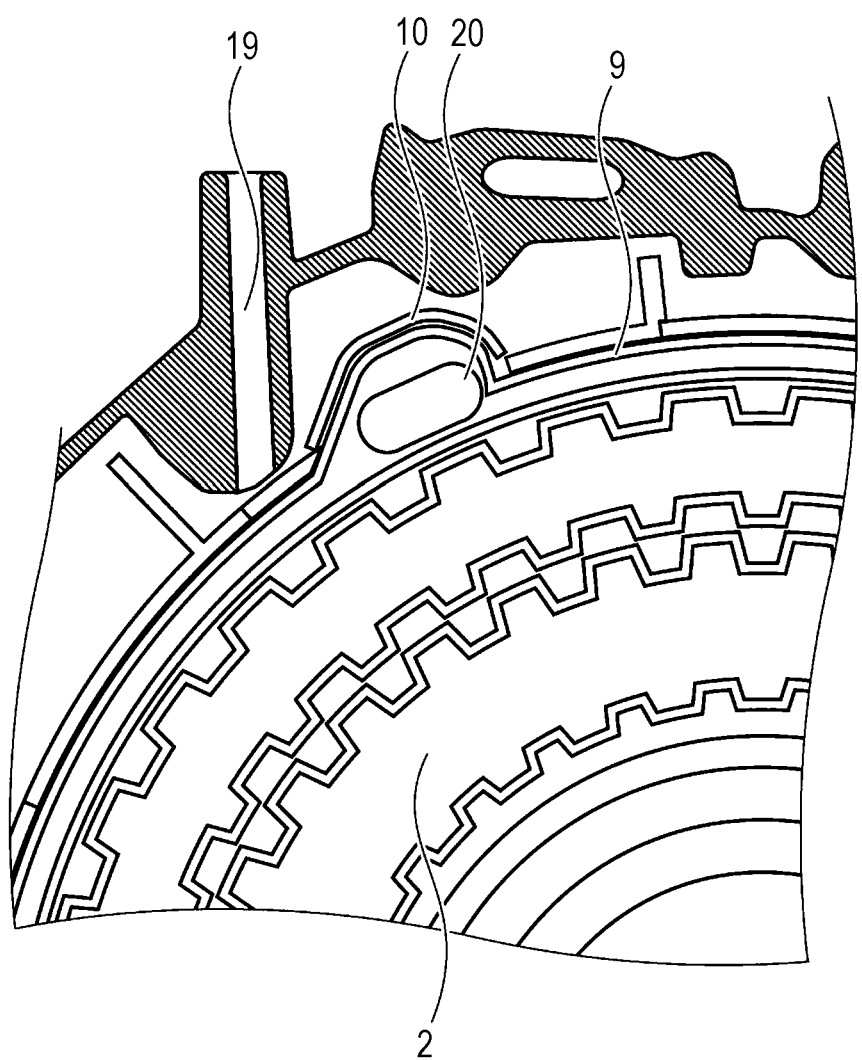
FIG. 7 shows a breather of the power transmission apparatus according to this embodiment.

Furthermore, as shown in FIGS. 7 and 8, the upper ends of the first partial baffle portion 9 and second partial baffle portion 10 are provided with discharge ports 20 for discharging the lubricating oil, at a position above and on the downstream side, in the rotation direction, of the inner opening of the breather hole 19. With this configuration, the lubricating oil discharged from the discharge ports 20 can be prevented from flowing out from the breather hole 19.

Furthermore, in this embodiment, the flow rate of the lubricating oil supplied to the friction clutch 2 is determined such that the oil level in the oil reservoir containing the lubricating oil, inside the baffle portion 8, is kept higher than the bottom of the first partial baffle portion 9 in the perpendicular direction.

In the power transmission apparatus according to this embodiment, by filling the clearance for a tool for fastening the bolts 12 that are used to fix the first partial baffle portion 9 with the projecting portions 14 provided on the second partial baffle portion 10 and serving as protrusions, a smooth inner circumferential surface can be formed. With this configuration, it is possible to prevent turbulent flow of the lubricating oil from occurring at the recesses formed due to the protrusions 13, reducing the mixing resistance of the lubricating oil caused by the friction clutch 2, serving as the rotary member.

Furthermore, by forming a labyrinth structure for breathing between the second partial housing 17 and the second partial baffle portion 10 by utilizing the rib 17a, a breather chamber with a labyrinth structure can be formed without providing dedicated parts for the breather. Hence, it is possible to reduce the component count and to simplify the manufacturing process.

[1] The present application discloses a rotary-member lubricating structure including: a housing that accommodates a speed-changing mechanism including a rotary member and accommodates lubricating oil for lubricating the speed-changing mechanism, the housing including a first partial housing provided on one side and a second partial housing provided on the other side; a baffle portion that is formed in a shape conforming to the shape of the rotary member included in the speed-changing mechanism and covers the rotary member to collect or discharge scattered lubricating oil, the baffle portion including a first partial baffle portion provided on one side of the rotary member and a second partial baffle portion provided on the other side of the rotary member; a support portion that is disposed between the first partial housing and the rotary member in the axial direction and supports the rotary member so as to be relatively rotatable; and a plurality of bolts that are disposed on the outer side of the rotary member in the circumferential direction and are used to fix the support portion and the first partial baffle portion to the first partial housing. The first partial baffle portion has protrusions protruding radially outward from the outer circumference of the baffle portion and has fastening holes provided in the protrusions and extending through the first partial baffle portion in the axial direction, into which fastening holes the plurality of bolts are screwed. The first and second partial housings are joined together by a plurality of fixing members disposed on the radially outer side of the first and second partial baffle portions. The second partial baffle portion has filling portions that fill the recesses in the first partial baffle portion formed due to the provision of the protrusions.

According to the present application, the recesses that are formed due to the protrusions and serving as clearance for a tool for fastening the bolts used to fix the first partial baffle portion are filled with the filling portions provided on the second partial baffle portion. Thus, the inner circumferential surface of the baffle portion can be made a relatively smooth surface. Accordingly, it is possible to prevent turbulent flow of the lubricating oil due to the recesses at the protrusions, reducing the mixing resistance of the lubricating oil caused by the rotary member.

[2] Furthermore, the present application may be configured such that: the second partial housing has a plurality of chambers 17d that are divided by a plurality of ribs provided on one side surface of the housing; the second partial baffle portion connects the plurality of ribs through a labyrinth structure, the plurality of ribs each having a groove through which the chambers on both sides of the rib can be ventilated; and at least one of the plurality of chambers has a communicating hole communicating with the outside through the second partial housing.

By forming a breather chamber between the housing and the baffle portion, the need for dedicated parts for the breather is eliminated, contributing to a reduction in component count and simplification of the manufacturing process.

[3] Furthermore, the present application may be configured such that: the rotary member is a friction clutch; the second partial housing is provided with a driving source on the other side; and the housing is provided with a communicating hole that connects the inside of the housing and the outside air and communicates with a space accommodating a damper mechanism for stabilizing a driving force of the driving source.

According to the present application, by making the communicating hole communicating with the atmosphere serve as a damper chamber, entrance of water and dust can be prevented.

[4] Furthermore, the present application may be configured such that the first partial baffle portion has a recess that accommodates the support portion. According to the present application, by eliminating a step on an inner end face of the first partial baffle portion, the mixing resistance can be further reduced.

[5] Furthermore, the present application may be configured such that the oil level of the lubricating oil is kept higher than the bottom of the first partial baffle portion in the perpendicular direction, and the two partial baffle portions are joined together by inserting an end of one of the first and second partial baffle portions into a receiving groove provided in an end of the other. According to the present application, by inserting the end of one of the first and second partial baffle portions into the receiving groove provided in the other and joining them, entrance of the lubricating oil from the outside is prevented, and an appropriate level of the lubricating oil is maintained. Hence, the mixing resistance of the clutch can be further reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A rotary-member lubricating structure comprising:
a housing that accommodates a speed-changing mechanism including a rotary member and accommodates lubricating oil for lubricating the speed-changing mechanism, the housing including a first partial housing provided on one side and a second partial housing provided on the other side;
a baffle portion that is formed in a shape conforming to the shape of the rotary member included in the speed-changing mechanism and covers the rotary member to collect or discharge scattered lubricating oil, the baffle portion including a first partial baffle portion provided on one side of the rotary member and a second partial baffle portion provided on the other side of the rotary member;
a support portion that is disposed between the first partial housing and the rotary member in the axial direction and supports the rotary member so that the rotary member and the support portion are rotatable relative to each other; and
a plurality of bolts that are disposed on the outer side of the rotary member in the circumferential direction and are used to fix the support portion and the first partial baffle portion to the first partial housing,
wherein
the first partial baffle portion has protrusions protruding radially outward from the outer circumference of the baffle portion and has fastening holes provided in the protrusions and extending through the first partial baffle portion in the axial direction, into which fastening holes the plurality of bolts are screwed,
the first and second partial housings are joined together on the radially outer side of the first and second partial baffle portions, and
the second partial baffle portion has filling portions that fill the recesses in the first partial baffle portion formed due to the provision of the protrusions.

2. The rotary-member lubricating structure according to claim 1, wherein
the second partial housing has a plurality of chambers that are divided by a plurality of ribs provided on one side surface of the housing,
the second partial baffle portion connects the plurality of ribs through a labyrinth structure, the plurality of ribs each having a groove through which the chambers on both sides of the rib can be ventilated, and
at least one of the plurality of chambers has a communicating hole communicating with an outside of the housing through the second partial housing.

3. The rotary-member lubricating structure according to claim 1, wherein
the rotary member is a friction clutch,
the second partial housing is provided with a driving source on the other side of the rotary member, and
the housing is provided with a communicating hole that connects the inside of the housing and the outside air and communicates with a space accommodating a damper mechanism for stabilizing a driving force of the driving source.

4. The rotary-member lubricating structure according to claim 1, wherein the first partial baffle portion has a recess that accommodates the support portion.

5. A rotary-member lubricating structure comprising:
a housing accommodating a speed-changing mechanism including a rotary member and accommodating lubricating oil for lubricating the speed-changing mechanism, the housing including a first partial housing provided on a first side of the rotary member and a second partial housing provided on a second side of the rotary member opposite to the first side;
a baffle portion having a shape conforming to a shape of the rotary member included in the speed-changing mechanism and covering the rotary member to collect or discharge scattered lubricating oil, the baffle portion including a first partial baffle portion provided on the first side of the rotary member and a second partial baffle portion provided on the second side of the rotary member, the first partial baffle portion having a protrusion protruding radially outward from an outer circumference of the baffle portion and a fastening hole provided in the protrusion and extending through the first partial baffle portion in an axial direction of the rotary member, the second partial baffle portion having a filling portion to fill a recess in the first partial baffle portion provided due to the protrusion, the first and second partial housings being joined together on a radially outer side of the baffle portion;
a support portion disposed between the first partial housing and the rotary member in the axial direction to support the rotary member so that the rotary member and the support portion are rotatable relative to each other; and
a bolt disposed on an outer side of the rotary member in a circumferential direction of the rotary member to fix the support portion and the first partial baffle portion to the first partial housing and screwed into the fastening hole of the first partial baffle portion.

6. The rotary-member lubricating structure according to claim 5,
wherein the second partial housing has chambers that are divided with ribs provided on one side surface of the housing,
wherein the second partial baffle portion connects the ribs through a labyrinth structure,
wherein the ribs each have a groove to ventilate first chambers among the chambers disposed on both sides of one of the ribs through the groove, and
wherein at least one of the chambers has a communicating hole passing through the second partial housing to communicate with an outside of the housing.

7. The rotary-member lubricating structure according to claim 5,
wherein the rotary member comprises a friction clutch,
wherein a driving source is provided outside the housing on the second side of the rotary member, and
wherein the housing is provided with a communicating hole that connects inside of the housing and outside of the housing and that communicates with a space accommodating a damper mechanism for stabilizing a driving force of the driving source.

8. The rotary-member lubricating structure according to claim 5, wherein the first partial baffle portion has a recess that accommodates the support portion.

9. The rotary-member lubricating structure according to claim 5,
wherein the first partial baffle portion has a first open end, and the second partial baffle portion has a second open end provided with a receiving groove, and
wherein the first open end is inserted into the receiving groove.

10. The rotary-member lubricating structure according to claim 5,
wherein the first and second partial baffle portions are provided with a discharge port for discharging the lubricating oil extending through the first and second partial baffle portions in the axial direction.

* * * * *